US005127069A

United States Patent [19]

Horton

[11] Patent Number: 5,127,069
[45] Date of Patent: Jun. 30, 1992

[54] AUTOMATIC R. F. WAVEGUIDE COUPLER

[75] Inventor: Lewis O. Horton, Earlysville, Va.
[73] Assignee: Sperry Marine Inc., Charlottesville, Va.

[21] Appl. No.: 698,438
[22] Filed: May 10, 1991
[51] Int. Cl.[5] ............ G02B 6/38
[52] U.S. Cl. ............ 385/53; 385/60
[58] Field of Search ............ 350/96.2, 96.21, 96.22

[56] References Cited

U.S. PATENT DOCUMENTS 5,016,971 5/1991 Hsu et al. ............ 350/96.21

*Primary Examiner*—William L. Sikes
*Assistant Examiner*—Robert E. Wise
*Attorney, Agent, or Firm*—Seymour Levine; Albert B. Cooper

[57] ABSTRACT

An autocoupler flange is coupled to a rigid waveguide through a flexible waveguide. The autocoupler flange is supported in a stationary housing by support pins projecting through shaped apertures in the housing and a system of springs to maintain the autocoupler flange in a position skewed to the vertical. The autocoupler flange includes a stop member with a horizontal alignment slot therein. A movable waveguide flange has an alignment bracket secured thereto, the alignment bracket including a horizontal alignment pin. Vertical motion of the movable waveguide flange and alignment bracket engages the autocoupler flange, lifting the autocoupler flange from its support on the stationary housing. The horizontal alignment pin engages the horizontal alignment slot to provide horizontal alignment between the flanges. In the coupled position, the autocoupler flange is supported on the waveguide flange with the system of springs locking the flanges together. Vertical and rotational adjustment screws in the alignment bracket engage the stop member to vertically and rotationally align the waveguide flanges.

11 Claims, 4 Drawing Sheets

AUTOMATIC R. F. WAVEGUIDE COUPLER

BACKGROUND OF THE INVENTION

1. Field of the Invention

The invention relates to the coupling of R.F. waveguide, particularly with respect to coupling and uncoupling a movable R.F. waveguide with respect to a fixed waveguide.

2. Description of the Prior Art

Rigid waveguide, flexible waveguide and rotary microwave joints are commonly utilized to configure microwave transmission systems. Such components include flanges which are bolted together to provide appropriately aligned R.F. paths with zero air gaps. Rotary waveguides are utilized when portions of systems rotate with respect to each other. Flexible waveguide is utilized when one portion of a system experiences small amplitude translational motion with respect to another portion of the system. In commonly encountered situations, the relative motion is often of a magnitude that flexible waveguide cannot practically and reliably accommodate the displacements. In such arrangements, the R.F. path is coupled and uncoupled by waveguide flanges that are positioned as close as possible with respect to each other, without mechanical coupling therebetween, so that the coupling and uncoupling required by the relative motion can occur. This arrangement is, for example, utilized in rotatable radar antenna mast configurations where the mast is extended and retracted over relatively large distances.

Such a system is disclosed in pending U.S. patent application Ser. No. 07/618,782 entitled "Mast Translation And Rotation Drive System Utilizing A Ball Drive Screw And Nut Assembly" by William E. West and assigned to the assignee of the present invention. In the system of said Ser. No. 618,782, a radar antenna is extended from a submarine, rotated in a scanning mode and retracted back into the submarine when not in use. A rotary joint attached to the antenna mast accommodates the rotational motion but travels through large linear displacements during extension and retraction. In the prior art, the rotary joint waveguide flange is not physically coupled to the flange of the stationary rigid waveguide that provides the R.F. signal to the antenna when the mast is extended. The two waveguide flanges are positioned as close as possible with respect to each other so as to accommodate the relative translational motion during extension and retraction. This arrangement results in an air gap and waveguide misalignment that vary as the antenna rotates. The air gap and misalignment result in system R.F. losses, signal fluctuations and safety hazards. In order for reasonable R.F. coupling to be maintained, this prior art arrangement requires position accuracy and repeatability each time the antenna is raised.

SUMMARY OF THE INVENTION

The disadvantages of the prior art are overcome by an automatic waveguide coupler for coupling a first waveguide flange means to a second waveguide flange means, the first waveguide flange means being movable from a first position remote from the second waveguide flange means to a second position proximate the second waveguide flange means. The second waveguide flange means includes a stop member and is disposed in a stationary support for rotational and translational motions with respect to the stationary support. Force means urge the second waveguide flange means toward the first waveguide flange means when the first waveguide flange means is in the second position. When the first waveguide flange means is in the first position, the force means holds the second waveguide flange means in a position with respect to the stationary support so that when the first waveguide flange means moves toward the second position, the first waveguide flange means contacts the second waveguide flange means, rotating the second waveguide flange means toward the first waveguide flange means. As the first waveguide flange means translates into the second position, the first waveguide flange means contacts the stop member, thereby aligning the first waveguide flange means with the second waveguide flange means.

Preferably, flexible waveguide couples microwave energy to the second waveguide flange means, the second waveguide flange means comprises an L-shaped member and the force means comprises a system of springs holding the L-shaped member in the stationary support. The L-shaped member is positioned within the stationary support by pins projecting through shaped apertures in the walls of the stationary support. In the uncoupled position, the springs urge the support pins of the L-shaped member against the edges of the apertures positioning the L-shaped member at an angle skewed with respect to the first waveguide flange. The L-shaped member is rotated and lifted by the first waveguide flange means as the first waveguide flange means moves into the second position. In the second position, the support pins of the L-shaped member are moved away from the edges of the apertures and the L-shaped member is supported on the first waveguide flange means and aligned therewith, with the springs forcing the flanges together.

The first waveguide flange means includes an alignment bracket with an alignment pin that engages a slot at the top of the L-shaped member to provide horizontal alignment therebetween. Adjustment screws in the alignment bracket provide for vertical and rotational alignment of the flanges. A sensor switch on the L-shaped member detects when the first waveguide flange means is appropriately positioned.

DESCRIPTION OF THE PREFERRED EMBODIMENT

Figure 3:
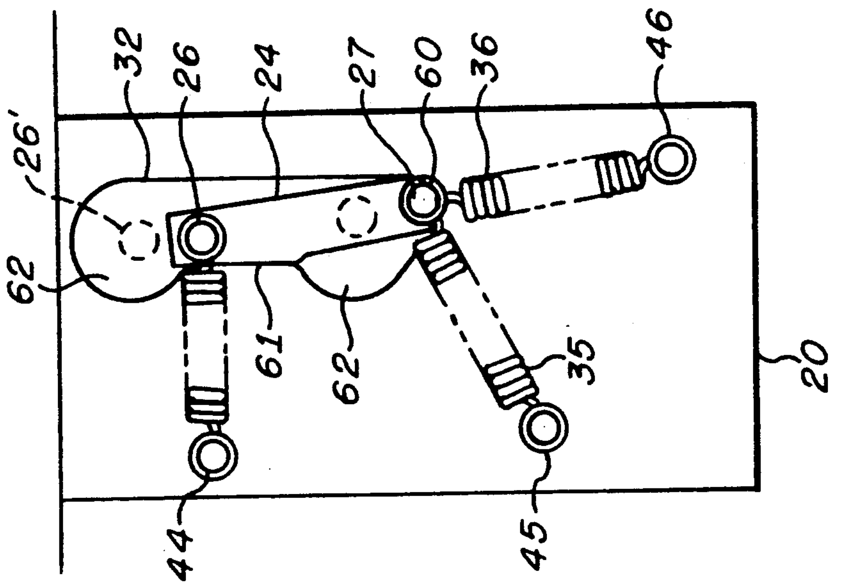
FIG. 3 is a side elevation view of the stationary housing of the automatic waveguide coupler of the present invention illustrating the spring, pin and aperture support for the autocoupler flange.
Figure 1:
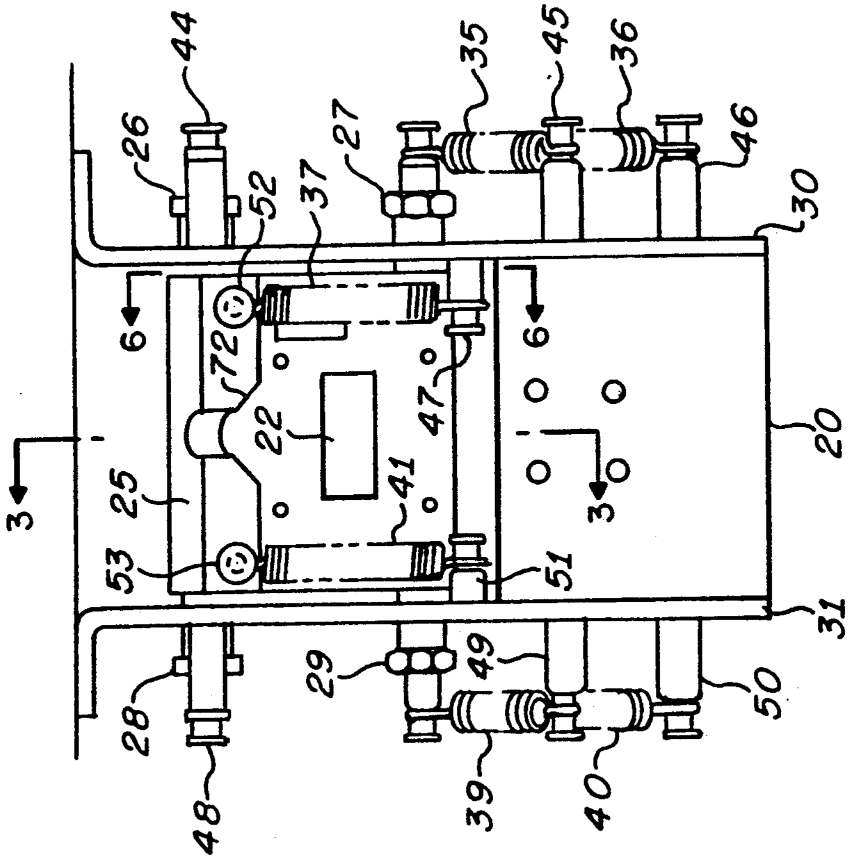
FIG. 1 is a front elevation view of the autocoupler flange and stationary housing of the automatic waveguide coupler of the present invention illustrating the uncoupled condition.
Figure 2:
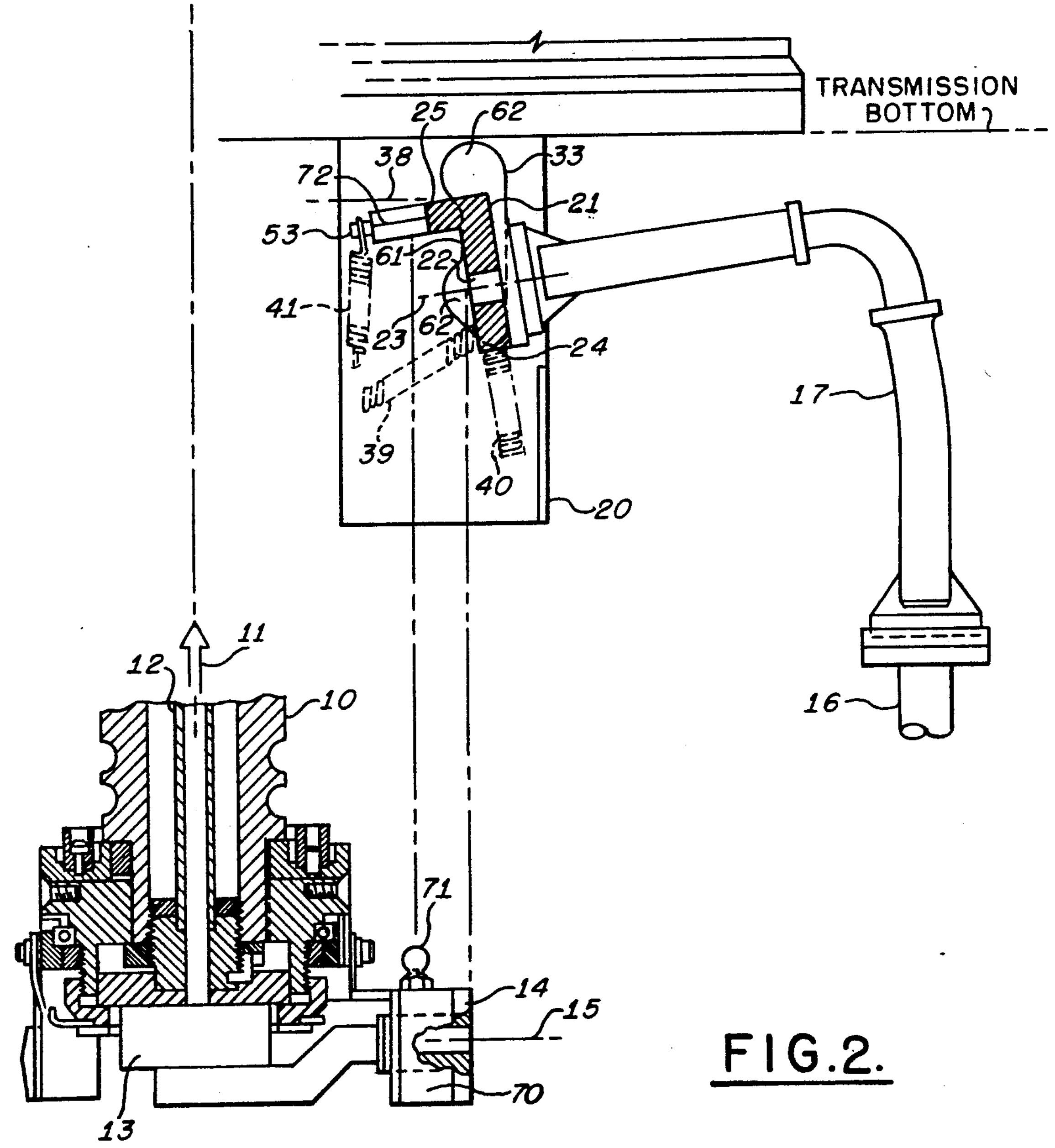
FIG. 2 is a side sectional elevation view of the automatic waveguide coupler of the present invention illustrated in the uncoupled position with the autocoupler flange and stationary housing section taken along line 2—2 of FIG. 1.

Referring to FIGS. 1, 2 and 3, in which like reference numerals indicate like elements, the automatic waveguide coupler of the present invention is illustrated. The preferred embodiment of the invention is described with respect to the radar antenna mast extension and retraction system of said Ser. No. 618,782, which is incorporated herein by reference. As described in said Ser. No. 618,782, a lead screw 10 translates in the direction of arrow 11 in order to extend the antenna mast (not shown) of the system of which the present invention is a component. The lead screw 10 is moved in the direction of arrow 11 for coupling microwave energy to the system antenna. FIG. 2 illustrates a waveguide 12, coaxial with the lead screw 10, for coupling microwave energy to the radar antenna through conventional rotary joint 13. The microwave energy is coupled to the rotary joint 13 through a waveguide flange 14 attached to the rotary joint 13 and the waveguide centerline is depicted by reference numeral 15. The microwave energy for the radar antenna is applied to the antenna system at a rigid waveguide 16. A 90° flexible waveguide 17 is attached to the rigid waveguide 16 for providing flexibility for the operation of the automatic waveguide coupler of the present invention, in a manner to be described.

Attached to the bottom of the mast drive transmission (Ser. No. 618,782) is a three-sided stationary housing 20 that contains and supports an autocoupler flange 21. The autocoupler flange 21 is affixed to the end of the flexible waveguide 17 providing the microwave signal from the rigid waveguide 16 at waveguide exit port 22. The waveguide centerline of the exit port 22 is depicted by reference numeral 23. The autocoupler flange 21 is an L-shaped component comprising waveguide flange 24 and a stop member 25. The autocoupler flange 21 is supported in the stationary housing 20 by four pins 26-29 projecting through sidewalls 30 and 31 of the housing 20 through respective shaped apertures 32 and 33. The aperture 32 is in the sidewall 30 and the aperture 33 is in the sidewall 31. The support pins 26 and 27 project through the aperture 32 and the support pins 28 and 29 project through the aperture 33.

The autocoupler flange 21 is supported in the housing 20 by eight springs 34–41 coupled to stationary posts 44–51, respectively. As is best seen in FIG. 3, spring 34 couples support pin 26 to post 44, spring 35 couples support pin 27 to post 45 and spring 36 couples support pin 27 to post 46. It is appreciated that the springs 34–36 and posts 44–46 reside on the outside of the housing 20. In a similar manner, the springs 38–40 couple the support pins 28 and 29 to posts 48–50 outside the wall 31 of the housing 20. Springs and 41 support the autocoupler flange 21 inside the housing 20 by coupling posts 52 and 53 affixed to the stop member 25 to posts 47 and 51 affixed to the inside surfaces of the walls 30 and 31, respectively, of the housing 20.

As best seen in FIG. 3, the aperture 32 (and the aperture 33) have a lower point 60, a vertical edge 61 and open spaces 62. In the uncoupled mode illustrated in FIGS. 1-3, springs 36, 37, 40 and 41 maintain the support pins 27 and 29 at the points 60 of the apertures 32 and 33 and the springs 34 and 38 maintain the support pins 26 and 28 bearing against the aperture edges 61. Thus, as seen in FIG. 2, the autocoupler flange 21 is held by the springs at a slight angle skewed from the vertical.

It is appreciated from the foregoing, that the autocoupler flange 21, which is attached to the flexible waveguide 17, is supported by the springs 34–41 in the stationary housing 20 to locate and control the flexible waveguide 17 when the unit is uncoupled.

Figure 4:
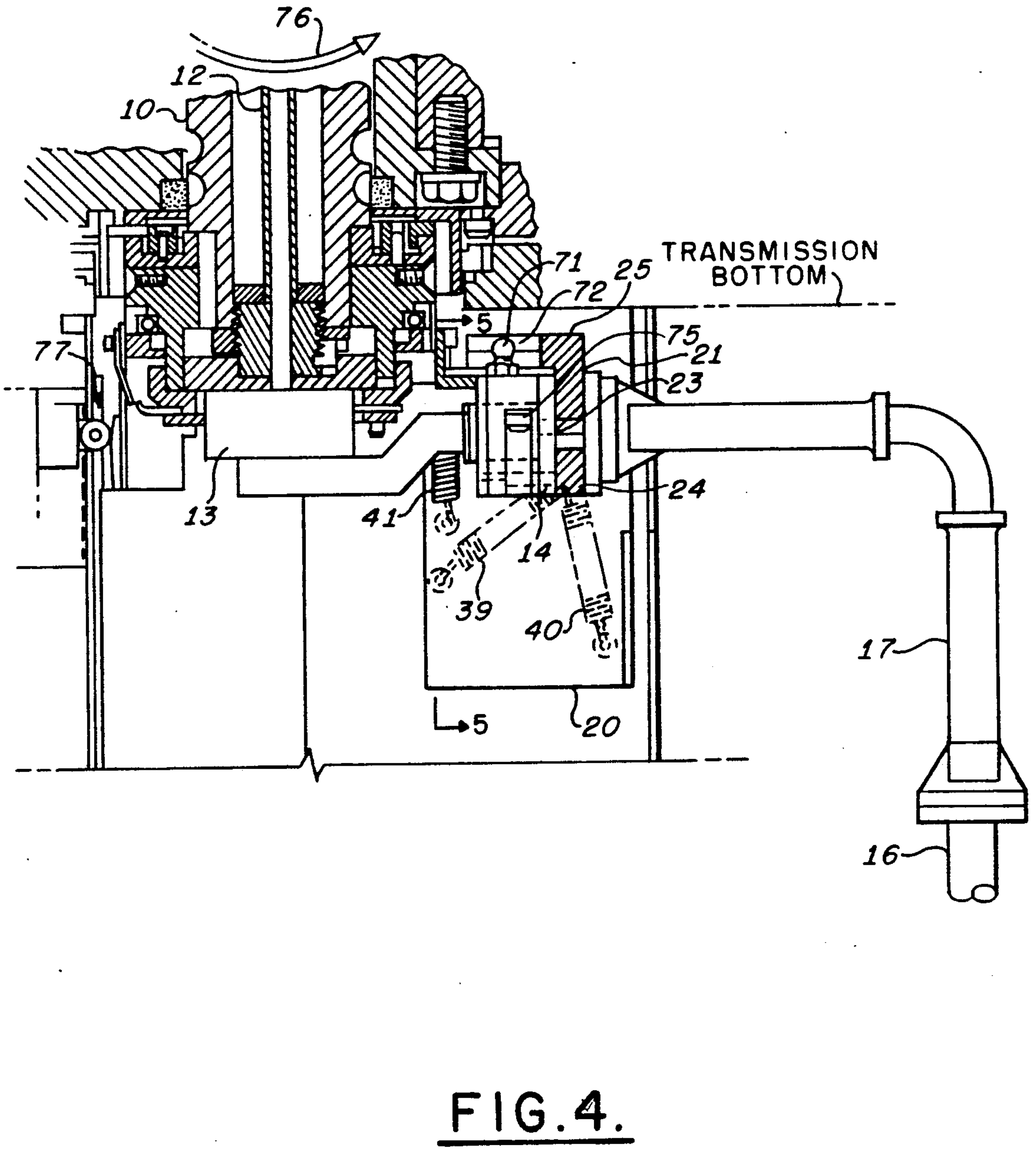
FIG. 4 is a side sectional elevation view, similar to that of FIG. 2, of the automatic waveguide coupler of the present invention illustrated in the coupled position.
Figure 5:
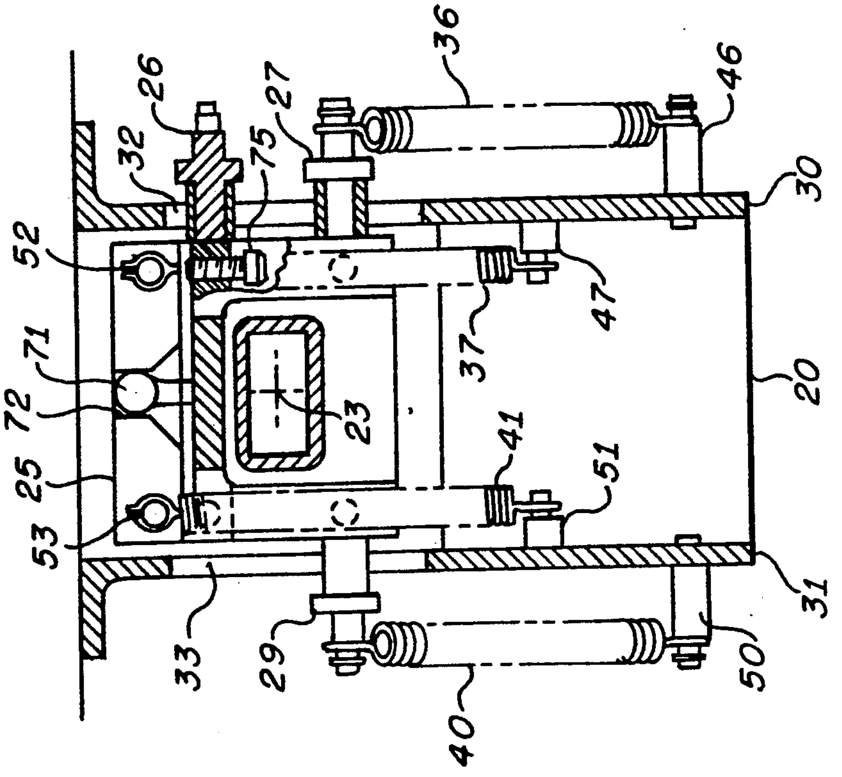
FIG. 5 is a front sectional elevation view of the autocoupler flange and stationary housing of the automatic waveguide coupler taken along line 5—5 of FIG. 4 and illustrated in the coupled position.

Attached to the movable waveguide flange 14 is an alignment bracket 70 which contains horizontal alignment pin 71 and vertical and rotational adjustment screws to be described with respect to FIGS. 4 and 5. The stop member 25 of the autocoupler flange 21 includes a horizontal alignment guide slot 72 to engage the alignment pin 71 for providing horizontal alignment of the waveguide flange 14 with respect to the autocoupler flange 21.

As described in said Ser. No. 618,782, the waveguide flange 14 is horizontally constrained to maintain the radial position illustrated in FIG. 2 when the mast is extended in the direction of the arrow 11. Thus, when the alignment bracket 70 is moved vertically as the waveguide rotary joint 13 is raised, the alignment bracket 70 enters the housing 20. As the antenna mast approaches the extended position, the waveguide flange 14 contacts the member 24 and the alignment pin 71 engages in the autocoupler flange alignment slot 72, horizontally aligning the waveguides. Further vertical motion of the alignment bracket 70 causes the autocoupler flange 21 to rotate clockwise (as viewed in FIG. 2) bringing the member 24 and waveguide flange 14 into abutment. As the bracket 70 and autocoupler flange 21 continue to rise together to the fully extended position of the antenna mast, the autocoupler flange 21 is lifted from the stationary housing 20 until the support pins occupy the positions indicated at 26' and 27' in the open spaces 62 of the aperture 32 as illustrated in FIG. 3. The support pins 28 and 29 rise to similar positions in the aperture 33 in the sidewall 31. The autocoupler flange 21 is lifted from the stationary housing 20 on adjustment screws in the alignment bracket 70, in a manner to be described with respect to FIGS. 4 and 5.

As the alignment bracket 70 attains the fully extended position, the spring tension increases so that the horizontal components of the spring forces firmly force and hold the waveguide flanges together. Specifically, the springs 34 and 38 urge the top of the waveguide flanges together, while the springs 35 and 39 urge the bottom of the waveguide flanges together. The springs 35, 36, 37, 39, 40 and 41 pull the autocoupler flange 21 in a downward direction, firmly holding the stop member 25 against the adjustment screws (to be described) in the alignment bracket 70. It is appreciated that in the completely raised position, the autocoupler flange 21 is fully supported on the waveguide flange 14 and alignment bracket 70 with the springs holding the flanges firmly together. The springs and flexible waveguide permit the locked flanges to move together, ensuring the integrity of the waveguide R.F. path between the autocoupler flange 21 and the rotary joint 13 against disturbing motions and vibrations induced by the rotary scanning of the antenna and vibrations of the vessel in which the system is mounted.

When the antenna mast is retracted and the rotary joint 13 lowered, the alignment pin 71 simply disengages from the alignment slot 72 and the springs return the autocoupler flange 21 to the position illustrated in FIGS. 1-3 When the mast is retracted, the springs 36 and 40 urge the support pins 27 and 29 into the lower point 60 of the apertures 32 and 33, while the springs 34 and 38 urge the support pins 26 and 28 against the edges 61 of the apertures 32 and 33.

Referring to FIGS. 4 and 5, in which like reference numerals indicate like elements with respect to FIGS. 1-3, the rotary joint 13 is illustrated in the fully raised position with the waveguides coupled. As seen, the alignment pin 71 in the alignment slot 72 horizontally aligns the autocoupler flange 21 with respect to the waveguide flange 14 of the rotary joint 13. The alignment bracket 70 includes two vertical and twist adjustment screws 75, only one of which is illustrated for drawing clarity. With respect to FIG. 5, it is appreciated that the second adjustment screw is located on the left side of the drawing in a position corresponding to the screw 75 illustrated on the right side thereof.

When the alignment bracket 70 engages the autocoupler flange 21 as the mechanism is raised, the tips of the adjustment screws 75 engage the stop member 25 which is maintained in firm contact therewith by the action of the springs as previously described. By appropriate pre-adjustment of the screws 75, the relative height and twist of the waveguide flange 14 with respect to the autocoupler flange 21 is determined to ensure exact alignment of the waveguide R.F. path. Thus, by action of the horizontal alignment pin 71 and slot 72 and adjustment of the screws 75, the waveguides are precisely aligned and are locked into gap-free coupling by the springs.

An arrow 76 indicates rotary motion of the antenna mast after coupling has been effected. A keyway and slot mechanism 77 is included to enhance mechanical stability of the system as the antenna mast is rotated. The present invention locks the coupler to the waveguide yet remains flexible, because of the flexible waveguide 17, such that relative motion can be accommodated between the rotary joint 13 and the rigid waveguide 16.

Figure 6:
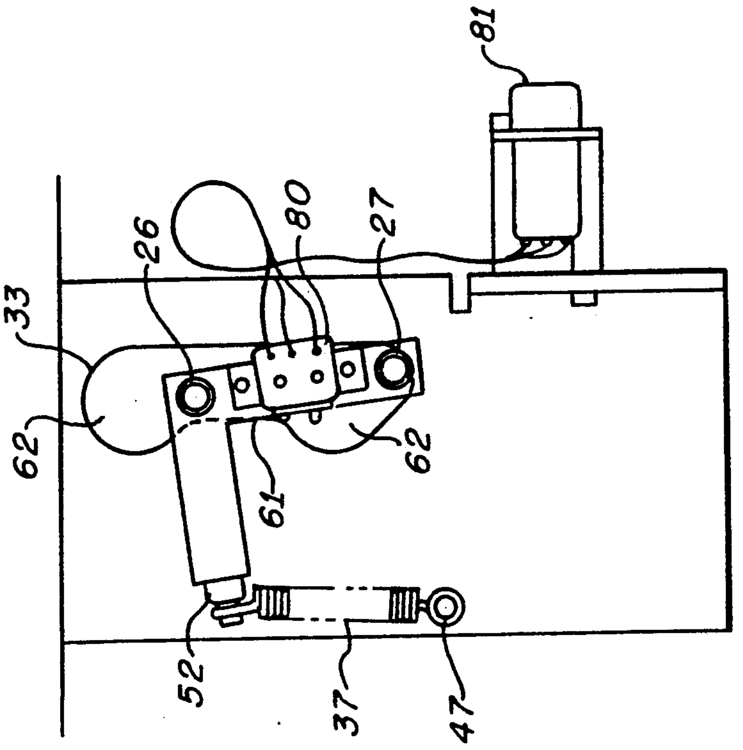
FIG. 6 is a side sectional elevation view taken along line 6—6 of FIG. 1 illustrating an interlock sensor of the present invention.

Referring to FIG. 6, in which like reference numerals indicate like elements with respect to FIGS. 1-5, a sensor mechanism for indicating when coupling is complete, is illustrated. Attached to the autocoupler flange 21 is a sensor switch 80 which actuates when the unit is coupled. Contact with the switch 80 by the waveguide flange 14 indicates that the coupling operation is completed. Thus, the sensor 80 provides a sensor interlock indication signal via a terminal contact 81 when the unit is properly coupled.

The present invention, utilizing springs and alignment devices, automatically aligns and locks flanges ensuring a continuous R.F. path to provide a waveguide joint with zero air gap over a variable position range while remaining flexible with respect to relative motions. The flanges align and engage over a variable range of vertical, horizontal and rotational tolerances reducing the prior art requirement for position repeatability and accuracy. The invention maintains a continuous waveguide R.F. path with no misalignment and no air gap when coupling is completed. Thus, the present invention solves the problem of coupling to and from rigid waveguide while minimizing R.F. losses at the connection. The present invention automatically couples and uncouples moving R.F. waveguide with respect to fixed waveguide while providing position compensation, automatic alignment with zero air gap, relative motion flexibility and interlock sensing.

The invention enables the attributes of flexible waveguide connections to be extended beyond fixed bolted flange connections to automatically coupled connections. Through the use of the springs and alignment mechanisms, as described, the invention provides for automatically aligning and locking a waveguide joint with zero air gap in the manner of a bolted joint within a specific range of space. This results in a rigid R.F. waveguide connection that permits for infinite coupling positions and waveguide movement within the autocoupler design space.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An automatic waveguide coupler for coupling first waveguide flange means to second waveguide flange means, said first waveguide flange means being movable from a first position remote from said second waveguide flange means to a second position proximate said second waveguide flange means, comprising stationary support means, a stop member on said second waveguide flange means, said second waveguide flange means being disposed in said stationary support means for rotational and translational motions with respect thereto, and force means for urging said second waveguide flange means toward said first waveguide flange means when said first waveguide flange means is in said second position, said force means holding said second waveguide flange means in a predetermined position with respect to said stationary support means when said first waveguide flange means is in said first position so that when said first waveguide flange means moves toward said second position, said first waveguide flange means contacts said second waveguide flange means, rotating said second waveguide flange means toward said first waveguide flange means and when said first waveguide flange means translates into said second position, said first waveguide flange means contacts said stop member, thereby aligning said first waveguide flange means with said second waveguide flange means.

2. The coupler of claim 1 wherein said second waveguide flange means is coupled to a rigid waveguide through a flexible waveguide.

3. The coupler of claim 2 wherein said second waveguide flange means comprises an L-shaped member with first and second legs, said first leg comprising said stop member, said flexible waveguide being coupled to said second leg.

4. The coupler of claim 1 wherein said force means comprises a system of springs.

5. The coupler of claim 4 wherein said stationary support means includes shaped apertures and said second waveguide flange means includes support pins projecting through said apertures so that said system of springs holds said second waveguide flange means in said predetermined position with said support pins contacting edges of said apertures when said first waveguide flange means is in said first position, said second waveguide flange means being supported by said first waveguide flange means when said first waveguide flange means is in said second position and locked thereto by said system of springs.

6. The coupler of claim 5 wherein said first waveguide flange means moves along a predetermined path from said first position to said second position, and said predetermined position of said second waveguide flange means comprises a position skewed at an angle with respect to said predetermined path.

7. The coupler of claim 4 wherein said first waveguide flange means comprises an alignment bracket secured to a first waveguide flange, said alignment bracket including an alignment pin.

8. The coupler of claim 7 wherein said stop member includes an alignment slot adapted to engage said alignment pin so that said first waveguide flange aligns with said second waveguide flange means when said first waveguide flange means moves into said second position.

9. The coupler of claim 8 wherein said alignment bracket includes adjustment screws for contacting said stop member when said first waveguide flange means moves into said second position, said alignment pin and alignment slot being so positioned and arranged to provide horizontal alignment between said first waveguide flange and said second waveguide flange means with adjustments of said adjustment screws providing vertical and rotational alignment therebetween.

10. The coupler of claim 7 wherein said alignment bracket includes adjustment screws for contacting said stop member when said first waveguide flange means moves into said second position.

11. The coupler of claim 4 further including a sensor switch on said second waveguide flange means for sensing when said first waveguide flange means moves into alignment with said second waveguide flange means as said first waveguide flange means moves into said second position.

* * * * *